(No Model.) 2 Sheets—Sheet 1.

A. L. WETHERILL.
HELIOGRAPH ATTACHMENT.

No. 527,640. Patented Oct. 16, 1894.

WITNESSES:
Paul Johot
C. Sedgwick

INVENTOR
A. L. Wetherill
BY Munn & Co.
ATTORNEYS.

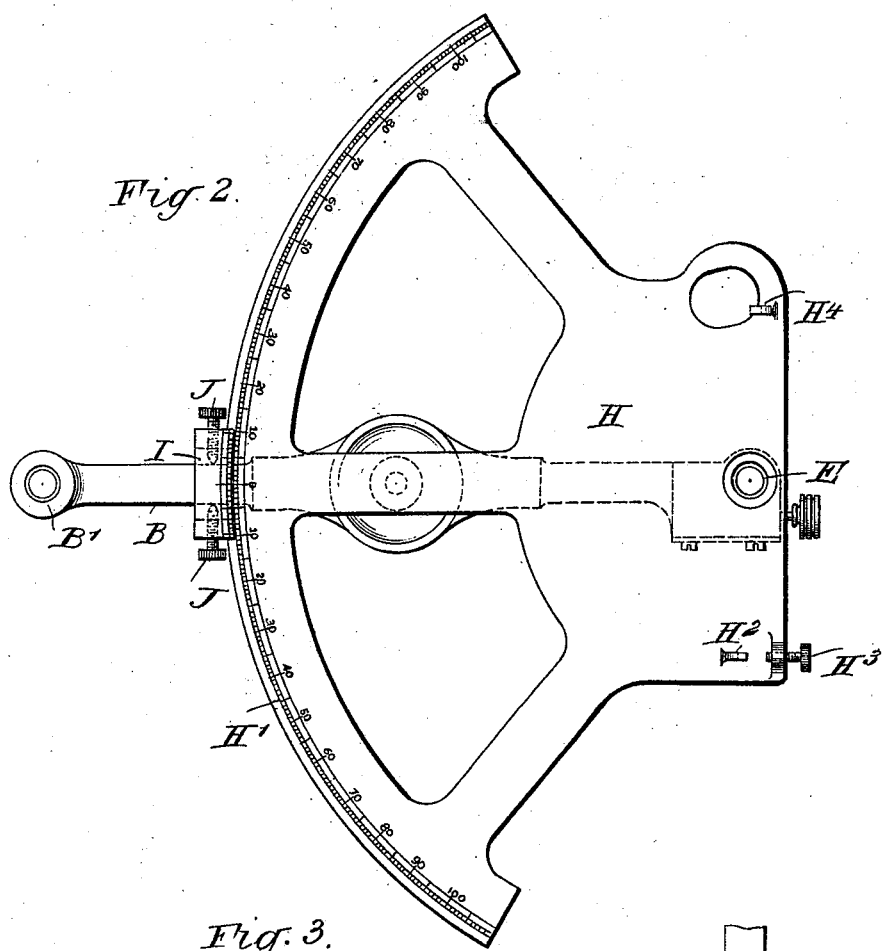
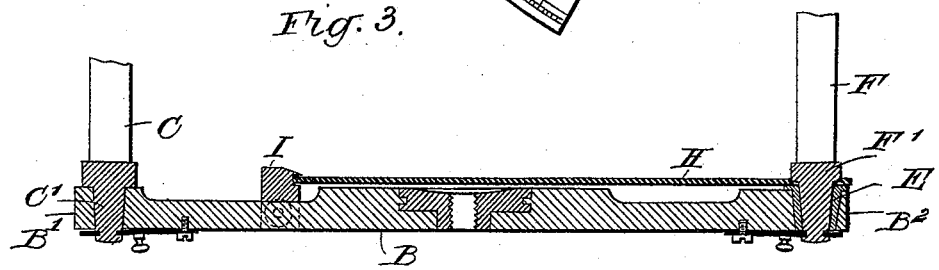

UNITED STATES PATENT OFFICE.

ALBERT LAWRENCE WETHERILL, OF PHILADELPHIA, PENNSYLVANIA.

HELIOGRAPH ATTACHMENT.

SPECIFICATION forming part of Letters Patent No. 527,640, dated October 16, 1894.

Application filed February 24, 1894. Serial No. 501,392. (No model.)

*To all whom it may concern:*

Be it known that I, ALBERT LAWRENCE WETHERILL, of Philadelphia, in the county of Philadelphia and State of Pennsylvania, have invented a new and Improved Heliograph Attachment, of which the following is a full, clear, and exact description.

The object of the invention is to provide a new and improved heliograph attachment, which is comparatively simple and durable in construction, and arranged for use as a range finder or for taking vertical and horizontal angles.

The invention consists principally of a graduated segment having its center in the mirror bar, and a vernier for the said segment and fastened on the mirror bar.

The invention also consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1:
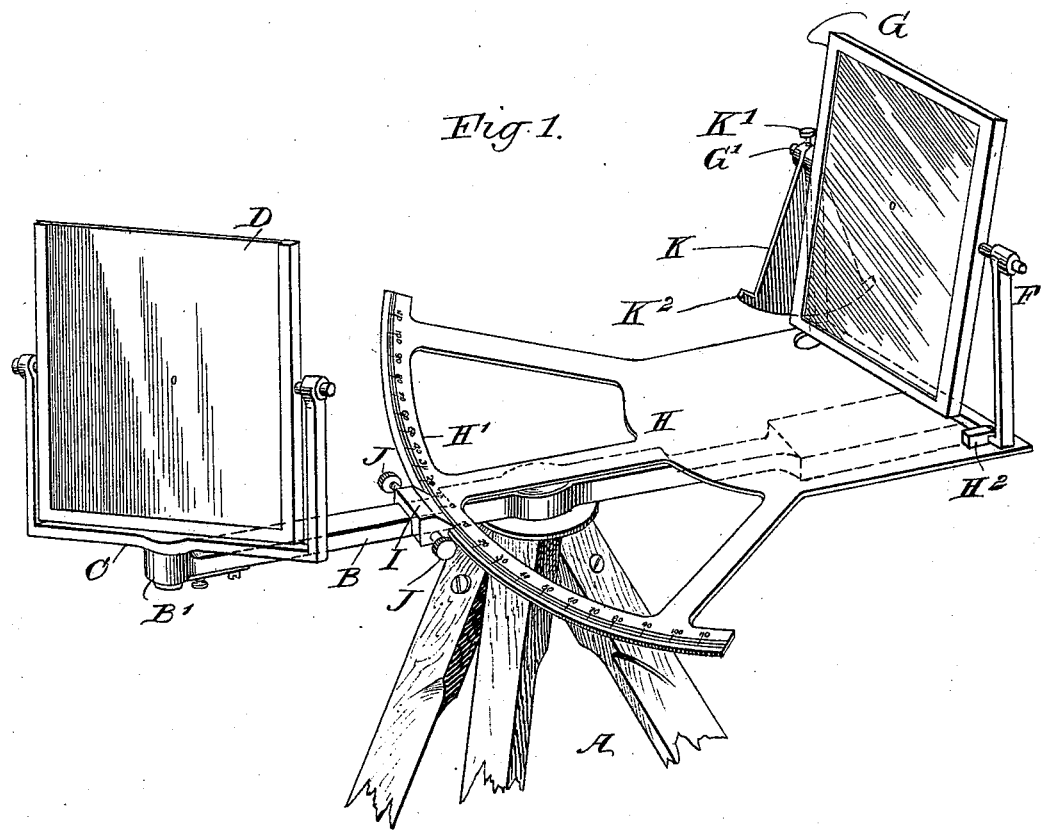
Figures 4, 5:
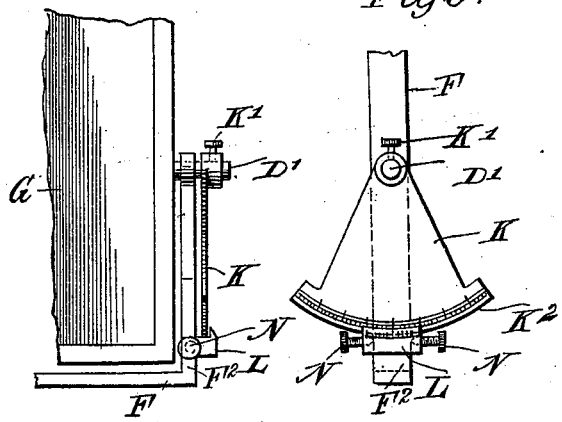
Figure 6:
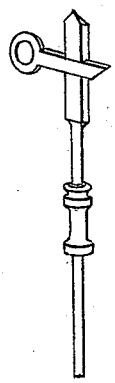

Figure 1 is a perspective view of the improvement as applied. Fig. 2 is an enlarged plan view of the improvement. Fig. 3 is a sectional side elevation of the same as arranged on the mirror bar and with the mirror frames in position. Fig. 4 is an enlarged end view of the device for reading vertical angles, as attached to one of the mirrors. Fig. 5 is a face view of the same; and Fig. 6 is a side elevation of the sliding sight rod.

The heliograph on which the improvement is applied is of any approved construction, and is provided with the usual tripod A, on which is mounted the mirror bar B, formed at one end with a socket B' engaged by the pivot C' of the mirror frame C, carrying the usual station or front mirror D, as is plainly illustrated in Fig. 1. In the other end of the mirror bar B is formed a socket $B^2$ engaged by a sleeve or bushing E, in which is journaled the vertically disposed pivot F' of the mirror frame F, carrying the sun mirror G, as illustrated in Fig. 1.

On the upper surface of the sleeve E is secured a segment H, extending forward over the mirror bar B, the said segment being provided with a limb H' graduated in degrees and subdivisions of ten minutes, as is plainly shown in Figs. 1 and 2, the graduations reading from zero at the middle to about one hundred degrees on each side.

A vernier I is adapted to be fastened on the mirror bar B by means of set screws J, and the said vernier serves for reading on the limb H', the vernier being graduated to ten seconds, so as to permit of a very fine reading.

In order to cause the segment H to turn with the frame F carrying the sun mirror G, I provide the rear, widened portion of the segment H, on one side, with a lug $H^2$ adapted to engage one outer end of the horizontal part of the mirror frame F, and directly opposite this lug $H^2$ is arranged a set screw $H^3$ adapted to engage the opposite side of the horizontal part of the frame F, as will be readily understood by reference to Figs. 1 and 2. The segment H is also provided with a lug $H^4$ adapted to engage the horizontal rear part of the mirror frame F, so that the latter stands at right angles to the longitudinal center line of the segment H, whenever the pivot F' is engaged in the sleeve E, and the horizontal part of the mirror frame F abuts on the lugs $H^2$, $H^4$, and is adjusted in place by set screw $H^3$.

The segment H as arranged is designed for taking horizontal angles, and in order to take vertical angles, I provide the trunnion G' of the mirror G with a segment K, similar in construction to the segment H and adapted to be fastened in place on the trunnion G' by a set screw K'. The limb $K^2$ of the vertically-disposed segment K is graduated similarly to the limb H', and is engaged by a vernier L adapted to be fastened by set screws N to the vertical part of the mirror frame F. The vernier L is graduated similarly to the vernier I, so as to read ten seconds.

In order to use the device for taking horizontal angles, for instance, the mirror bar B is first leveled by using a small level or other device and then the adjustable front sight, shown in Fig. 6 is inserted and vertically adjusted in the socket B', and the rear mirror G is placed in its corresponding socket with the pivot F' of the mirror frame F, engaging the sleeve E carrying the segment H and forming the center for the same. The mirror frame F is fastened in place on the segment H by adjusting the set screw $H^3$, as previously described, and then the operator, by looking through the unsilvered spot in the center of the mirror, can bring the sight to bear on the station to be observed. The mirror bar is then clamped in this position. The sighting rod is then replaced by the front mirror frame C, and the mirror D held in the said frame, after which the front mirror is made to face the rear one exactly, by means of the slow motion tangent screw, in the well-known manner, until the two unsilvered spots appear to co-incide exactly, as viewed through the hole in the rear mirror G. In other words, the operator sees his own eye reflected back to him. It will also be observed that as the unsilvered spot is exactly at the intersection of both axes of the mirror, this movement of the mirror does not alter the position of the spot. It is understood that the vernier I is fastened on the mirror bar B in such a manner that the zero point of the vernier registers with the zero point of the limb H'. The rear mirror G is now revolved on its vertical axis, that is, the pivot F', until the second station is seen by reflection in the front mirror D, the eye still looking through the hole in the rear mirror and being made to co-incide exactly with the center spot. Now, by turning the rear mirror F in the manner described, the segment H swings with it, so that the operator can finally read, after the reflected image of the second station has been made to appear co-incident with the spot, the exact degrees, on the limb H', thus giving the angle between the two stations from the point of observation as the apex reduced to the horizontal.

Should the first station happen to be on the same horizontal plane as the instrument, then the use of the sliding sight above mentioned may be dispensed with, and a bearing obtained directly through both mirrors D and G at once.

If the second station is above or below the level of the instrument, then the angular elevation or depression is read on segment K by the vernier L. Now, if after the horizontal angle is taken and the vertical angular difference between the two stations is required, then the mirror bar B is revolved a short distance, so as to remove the front mirror D out of the line of sight and the vertical angle of this station will then be taken by reflection, as before. This revolving of the mirror bar and again clamping it, does not destroy the level of the instrument, and the front mirror still faces the rear one, as before, because they turn on the bar together. Thus, it will be seen that the attachment can be conveniently used for surveying purposes, as described, without interfering in any way whatever with the use of the heliograph for its legitimate purpose; that is for transmitting telegraphic flashes according to the regular code. The device or attachment can readily be disconnected and removed from the heliograph whenever desired, and can be readily carried in the same pouch with the heliograph. It will also be seen that communication may be kept up with an assistant located at a distance, who may be holding a sighting rod or target, and instructions be sent to him by means of the regular code of telegraphic flashes, as it is not necessary to remove the attachment in order to use the heliograph for its legitimate purpose.

Having thus fully described my invention, I claim as new, and desire to secure by Letters Patent—

1. A heliograph attachment, comprising a graduated segment mounted upon the mirror bar to turn with one of the mirrors carried by said bar, the center of the segment co-inciding with the pivot of the mirror, and a vernier adapted to be secured to the mirror bar, substantially as described.

2. A heliograph attachment, comprising a segment having a graduated limb and provided with lugs arranged opposite the center of the segment, to engage the mirror frame, the pivot of which co-incides with the center of the segment, and a set screw for clamping the mirror frame in place on the said lugs, substantially as shown and described.

3. The combination with the mirror bar of a heliograph, of a graduated segment mounted upon the mirror bar with its center co-inciding with the pivot of one of the mirrors carried by said bar, and means for securing the mirror frame to the segment to cause them to turn together, substantially as described.

4. The combination with the mirror bar of a heliograph, of a graduated segment mounted upon the mirror bar with its center co-inciding with the pivot of one of the mirrors carried by said bar, means for locking the mirror frame to the segment, and a vernier secured to the mirror bar adjacent to the segment, substantially as described.

5. The combination with a heliograph mirror, of a graduated segment secured on one of the trunnions of the said mirror and extending vertically therefrom, and a vernier adapted to be fastened on the mirror frame and adapted to read on the graduated limb of the said segment, substantially as shown and described.

ALBERT LAWRENCE WETHERILL.

Witnesses:
S. S. HARTRANFT,
JNO. B. BISHOP.